United States Patent
Mohan (10) Patent No.: US 9,055,169 B2
(45) Date of Patent: Jun. 9, 2015

(54) PRINTING FRAMES OF A VIDEO

(71) Applicant: Hewlett-Packard Development Company, L.P., Houston, TX (US)

(72) Inventor: Srivatsan Mohan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/853,226

(22) Filed: Mar. 29, 2013

(65) Prior Publication Data

US 2014/0293296 A1    Oct. 2, 2014

(51) Int. Cl.
*G06F 3/12* (2006.01)
*G06K 15/00* (2006.01)
*H04N 1/00* (2006.01)

(52) U.S. Cl.
CPC ........ *H04N 1/00188* (2013.01); *H04N 1/00143* (2013.01); *H04N 1/00265* (2013.01); *H04N 1/00251* (2013.01); *H04N 1/00249* (2013.01); *H04N 1/00294* (2013.01); *H04N 1/00127* (2013.01); *H04N 1/00129* (2013.01); *H04N 2201/0086* (2013.01); *G06F 3/12* (2013.01); *H04N 1/00228* (2013.01); *H04N 1/00233* (2013.01); *H04N 1/00291* (2013.01); *H04N 2201/0082* (2013.01)

(58) Field of Classification Search
None
See application file for complete search history.

(56) References Cited

U.S. PATENT DOCUMENTS

| 5,842,929 | A | 12/1998 | Moody et al. |
|---|---|---|---|
| 7,027,513 | B2 | 4/2006 | Zhang |
| 7,110,135 | B2 | 9/2006 | Karaoguz et al. |
| 7,221,470 | B2* | 5/2007 | Takamine et al. ............. 358/1.15 |
| 7,823,055 | B2 | 10/2010 | Sull et al. |
| 7,864,352 | B2 | 1/2011 | Hull et al. |
| 7,983,340 | B2 | 7/2011 | Zhang |
| 8,094,990 | B2* | 1/2012 | Ichikawa ....................... 386/200 |
| 8,270,303 | B2 | 9/2012 | Sauerwein, Jr. et al. |
| 8,671,346 | B2* | 3/2014 | Hua et al. ...................... 715/723 |
| 2002/0135808 | A1* | 9/2002 | Parry ........................... 358/1.17 |
| 2003/0025933 | A1* | 2/2003 | Kimura et al. ................ 358/1.15 |
| 2004/0174443 | A1 | 9/2004 | Simske |
| 2004/0263895 | A1* | 12/2004 | Tomita et al. ................. 358/1.14 |
| 2006/0112080 | A1 | 5/2006 | Chen |
| 2006/0119597 | A1* | 6/2006 | Oshino ......................... 345/418 |
| 2007/0133947 | A1 | 6/2007 | Armitage et al. |
| 2009/0073266 | A1* | 3/2009 | Abdellaziz Trimeche et al. ............................. 348/180 |
| 2009/0212113 | A1 | 8/2009 | Chiu et al. |
| 2010/0260472 | A1* | 10/2010 | Okada ............................ 386/68 |
| 2012/0290437 | A1* | 11/2012 | Hibbard et al. ............. 705/26.41 |
| 2012/0324002 | A1 | 12/2012 | Chen |

OTHER PUBLICATIONS

DNR-326 2-Bay Professional Network Video Recorder (NVR), 2011, pp. 1-3, D-Link Corporation / D-Link Systems, Inc., Available at: <dlink.com.br/produtos-detalhes/items/dnr-326.html>.

(Continued)

*Primary Examiner* — Satwant Singh
(74) *Attorney, Agent, or Firm* — Law Office of Edouard Garcia (57) ABSTRACT

Systems and methods for printing a document over a network are described. In one implementation, print information is received from a user device, where the print information includes a frame time corresponding to the frame to be printed. The method further includes selecting the frame from the video based on the print information and printing the frame from a printer.

15 Claims, 7 Drawing Sheets

(56) References Cited

OTHER PUBLICATIONS

Hewlett-Packard Development Company, L.P., "Sharpen your document and data security," Nov. 15, 2012, <http://web.archive.org/web/20121115202433/http://h20195.www2.hp.com/V2/GetPDF.aspx/4AA3-1295ENW.pdf>.
Aurasma, "Partner Guidelines," Dec. 2012.
Rob Hallam, "Extract a Single Image from a Video Using FFMPEG," Jun. 19, 2010, <http://blog.roberthallam.org/2010/06/extract-a-single-image-from-a-video-using-ffmpeg/comment-page-1/>.
Simon Brown, "Using VLC to export frames from a video," May 11, 2012, <http://web.archive.org/web/20120511060316/http://www.isimonbrown.co.uk/vlc-export-frames>.
Tang et al., "Touchpaper—An Augmented Reality Application with Cloud-Based Image Recognition Service," Sep. 6, 2012, ICIMCS'12.
Jimmy Gunawan, "AURASMA / First Time Aura," Aug. 1, 2012, <http://puppetar.blogspot.com/2012/08/aurasma-first-time-aura.html>.
AppShopper.com. "HP Live Photo," Jan. 18, 2013, <http://web.archive.org/web/20130118041456/http://appshopper.com/photography/hp-live-photo>.
Aurasma, "HP Live Photo lets users share glimpses of life right off the printed page," Feb. 26, 2013, <http://www.aurasma.com/news/hp-live-photo-lets-users-share-glimpses-of-life-right-off-the-printed-pagel>.
Clausen, M. et al., "An Efficient Indexing and Search Technique for Multimedia Databases," (Research Paper), 2003, 12 pages, available at http://www-mmdb.iai.uni-bonn.de/download/publications/sigir-03.pdf.
GizmoGladstone, "Turn Pictures into AR Video with HP Live Photo," Feb. 14, 2013, <http://h20435.www2.hp.com/t5/The-Next-Bench-Blog/Turn-Pictures-into-AR-Video-with-HP-Live-Photo/ba-p/80857#,VkrpdyvF-gg>.
Hewlett-Packard Development Company, L.P., "HP Live Photo Terms of Service," Dec. 11, 2012, <http://h41112.www4.hp.com/pdf/mobile-apps/HPLIVEPHOTO_TERMSOFUSE%2012-10-12.pdf>.
PrintApper, "HP Live Photo FAQ, Help, and Support," Jan 9, 2013, <http://web.archive.org/web/20130211073116/http://h30434.www3.hp.com/t5/ePrint-Print-Apps-Mobile-Printing-and-ePrintCenter/HP-Live-Photo-FAQ-Help-and-Support/td-p/1956927>.
TheAppSide, "HP Live Photo iPhone app blends photos, videos and augmented reality," Dec. 12, 2012, <http://www.theappside.com/2012/12/12/hp-live-photo-iphone-app/>.

\* cited by examiner

PRINTING FRAMES OF A VIDEO

BACKGROUND

Nowadays, a large number of videos pertaining to different fields, such as lifestyle, music, arts, science, and movies, are available to users for viewing. On one hand, such videos are available to the users in digitally-recorded form, for example, digital video discs (DVD's) and compact discs (CD's), and, on the other hand, the users can watch and share such videos through video streaming portals.

Often, for several reasons, the users may seek to print one or more frames of a video being viewed. For example, a user may find a certain scenic background or a certain action scene in the video to be appealing and may seek to print the same. Generally, in such a case, the user takes a snapshot of the selected scene of the video and then provides a print command to a printer for printing the snapshot.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

The present subject matter relates to systems and methods for printing frames of a video, for example, over a network using cloud printing.

Typically, for printing a frame of a video, a user may take a snapshot of the selected frame of the video and save the snapshot. For example, the user, while watching a video on a video streaming website, may take a snapshot of the frame for printing. However, in certain cases, the snapshot may include undesirable contents, such as components of the interfaces of the video streaming portal and advertisement links being hosted by the video streaming portal. In such cases, the user may have to edit the snapshot using an image editing tool, before printing the frame to obtain a clean snapshot. Moreover, the resolution of the snapshot may be limited to the screen size of the communication device through which the user is watching the video. In such a case, the user may not obtain an image of an expected quality.

In certain other conventional techniques for printing one or more frames of a video, the complete video is segmented into frames and presented to a user. The user subsequently selects the frame which is to be printed, from among the various frames presented to the user. However, in such a case, segmenting the complete video into frames may be a considerably resource-intensive process. Moreover, in a case where the user is watching the video on the video streaming portal, the user has to download the video in order to allow the segmentation of the video into frames before the frame to be printed is selected. Such a process involving downloading and segmenting the video can again be resource consuming as well as time consuming, and therefore, inconvenient to the user.

Further, conventional techniques of printing frames from videos involve converting the video into a standard format. However, the standard format may be different from the original format of the video. Accordingly, in such cases, the resolution of the video may be adversely affected during conversion to the standard format, which can, in turn, affect the quality of the print obtained.

In accordance with the present subject matter, systems and methods for printing a frame of a video using cloud computing are described herein. In one example, for printing a frame of a video being viewed, print information corresponding to the frame of the video being viewed is transmitted to an image rendering system using a user device. The image rendering system processes the print information and extracts the frame which is to be printed from the video being viewed. Thereafter, the image rendering system transmits the frame to a cloud print server for printing.

In an example, for generating the print information associated with the frame to be printed, the user may provide a print input to select the frame to be printed from the video being viewed. In one example, the user may provide the print input to the video player through an interface embedded in the video player. In one example, the interface may include a print button embedded in the video player on which the video is being watched, on the video streaming portal or locally on the user device. In another example, the print input may be provided through a widget application for generating the print information.

Further, in an example, where the user is watching the video on a video streaming portal, the print information may include a uniform resource locator (URL) of the video hosted on the video streaming portal and a time corresponding to the frame which the user seeks to print. The time corresponding to the frame which the user seeks to print will be herein after referred to as frame time. In said example, the interface may also provide the user with an option to select a print quality of the frame to be printed. For example, the user may choose to print the frame in either high definition print, low resolution print, or the present resolution of the frame, thereby resulting in a satisfactory quality of the image of the frame to be printed. In another example, where the user is watching a video stored locally on a corresponding user device, the print information may include the video and the frame time of the frame of the video to be printed.

As mentioned previously, the print information is transmitted to the image rendering system which processes the print information to obtain a segment of the video. In one implementation, the segment includes a set of frames from among an entire set of frames of the video. The segment may be obtained based on the frame time included in the print information. Obtaining the segment based on the frame time averts the need for segmenting the complete video, thereby reducing the consumption of resources. For example, if the frame time provided in the print information is at 32.1 second, the image rendering system may obtain a segment of three seconds, i.e., 30-33 seconds, in the vicinity of the frame time. In one implementation, the image rendering system may obtain the segment of the video based on the URL provided in the print information. For example, if the print information includes a URL of a video on YouTube™ server, the image rendering system retrieves the segment of the video from the YouTube™ server. In another example, the image rendering system obtains the segment from the video provided in the print information.

Further, the image rendering system processes the segment of the video and obtains the frame to be printed, corresponding to the frame time. In a case where the frame corresponding to the frame time is of low quality, the image rendering system may select another frame from the segment of the video. In another example, the image rendering system may obtain a plurality of frames from the segment and, subsequently, select a frame from the plurality of frames. In said example, the image rendering system can implement one or more quality enhancement techniques on the selected frame before printing. In another example, the image rendering system may, at first, implement the quality enhancement techniques on each of the plurality of frames, determine a quality factor of each frame, and subsequently select the frame from amongst the plurality of frames based on the quality factor.

Once the frame to be printed is identified, the image rendering system transmits the identified frame to a cloud print server for printing the frame. The cloud print server, subsequently, prints the frame using a printer connected to the cloud print server. In another example, the image rendering system renders the frame to be printed and subsequently transmits the rendered frame to a cloud print server for printing the frame.

Thus, the methods and systems according to the present subject matter eliminate the need for the user to take a separate snapshot of the frame, thereby reducing the time for printing the frame. Furthermore, the need of a frame capturing tool for capturing the frame to be printed is averted. Moreover, the present subject matter allows for printing a frame of a video from any corresponding user device as the use of cloud printing eliminates the need for installing the printer drivers on the corresponding user devices. The present subject matter, for the foregoing reasons, provides a user friendly environment for printing a frame of a video.

These and other advantages of the present subject matter would be described in greater detail in conjunction with the following figures. While aspects of described system(s) and method(s) for printing frames of a video can be implemented in any number of different computing systems, environments, and/or configurations, example implementations are described in the context of the following example system(s).

Figure 1:
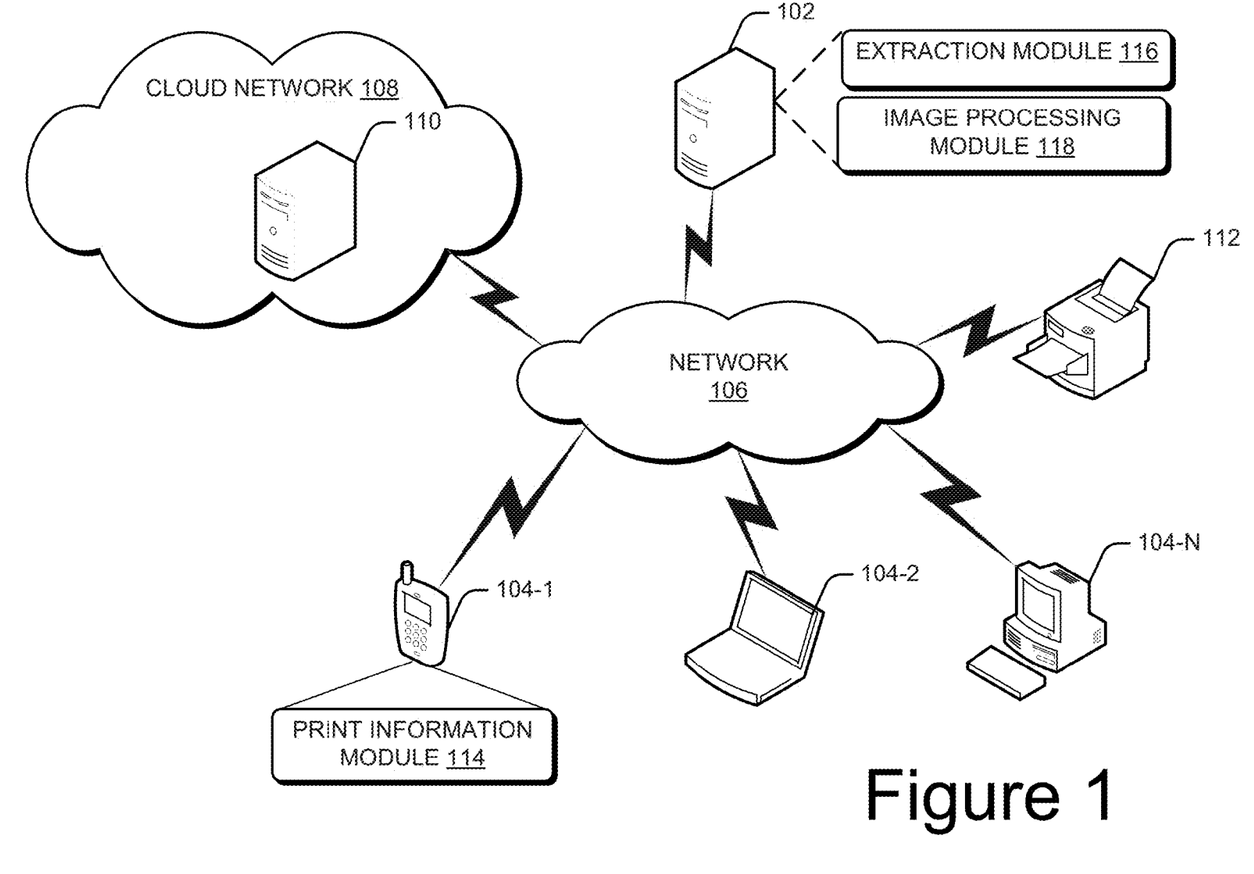
FIG. 1 illustrates a network environment for printing a frame of a video, according to an example of the present subject matter.

FIG. 1 illustrates a network environment 100 implementing an image rendering system 102 for printing frames of a video, according to principles of the present subject matter. The network environment 100 includes a plurality of user devices 104-1, 104-2 . . . 104-N, hereinafter collectively referred to as user devices 104 and individually referred to as user device 104, in communication with the image rendering system 102 through a network 106.

In one implementation, the image rendering system 102 may be one or more systems or computing devices, such as a desktop computer, cloud servers, mainframe computers, workstation, a multiprocessor system, a laptop computer, a network computer, a minicomputer, and a server. Further, the user devices 104 may be one or more computing devices, such as personal computers, desktop computers, minicomputers, laptops, wireless devices, a personal digital assistant, a smart phone, and a mobile phone.

The environment 100 further includes the cloud network 108 connected to the network 106. In one implementation, the cloud network 108 includes the cloud print server 110 through which the frames of the videos can be printed. Accordingly, the cloud print server 110 is further connected to a printer 112 over the network 106 for printing the frames of the videos being watched on and selected through the user devices 104. The printer 112, in one implementation, may be communicatively coupled to the cloud network 108 through the network 106. The printer 112 may be any one of various commercially available printers, such as a laser printer, a multi function printer, and an inkjet printer.

In an implementation, the network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include network devices, such as network switches, hubs, routers, HBAs, for providing a link between the image rendering system 102, the cloud printing server 110, the printer 112, and the user devices 104. The network devices within the network 106 may interact with the image rendering system 102 and the user devices 104 through communication links.

According to an aspect of the present subject matter, a user, while watching a video on a corresponding user device 104-1, may seek to print a frame of the video. For instance, the user, while watching the video on a video streaming portal, may find a certain frame to be appealing and seek to print the same. In another example, the user may seek to print a frame while watching the video which is stored locally on the user device 104-1. The user may provide a print input for printing the frame. In one example, the print input may be provided through an interface, say a print button embedded in a video player through which the user is watching the video. In another example, the print input may be provided through a widget application running on the user device 104-1. In another implementation, the user may hover upon a progress bar, showing the video as a plurality of frames spread across the progress bar, of the video player and select the frame for printing.

Upon receiving the print input from the user, a print information module 114 of the user device 104-1 generates print information. In one implementation, where the user is watching the video online on a video streaming portal, the print information may include a uniform resource locator (URL) of the video on the video streaming portal, and a time corresponding to the frame, also referred to as frame time. In said implementation, the print information module 114 can provide the user with an interface menu enlisting different versions of the video and their corresponding URL's. For example, the user may be watching the video in a low resolution quality, whereas, the user may be seeking to print a high quality image of the frame. Accordingly, the user may select the corresponding option for the high quality video from the interface menu. Subsequently, the URL corresponding to the video selected by the user is included in the print information. Further, the interface menu may include other printing options, such as size of paper, colored print options, and number of copies to be printed.

In another implementation, where the user is watching a video stored locally on the user device 104-1, the print information may include the video and the frame time.

In case the user selects the frame for printing from the progress bar of the video player, either on the video streaming portal or locally, to generate the print information, the print information module 114 determines the frame time corresponding to the frame selected by the user and includes the frame time in the print information. Further, the user device 104-1 can transmit the print information to the image rendering system 102, hereinafter referred to as system 102.

Upon receiving the print information, an extraction module 116 of the system 102, at first, determines whether the video is present in the print information or not. In case the print information includes the video, the extraction module 116 can obtain a segment of the video corresponding to the frame time specified in the print information. On the other hand, if the extraction module 116 determines that the print information does not include the video, the extraction module 116 can obtain the segment of the video based on the URL specified in the print information. In one example, the extraction module 116 may obtain the complete video based on the URL and subsequently extract the segment of the video based on the frame time.

Further, the extraction module 116 processes the segment of the video to extract the frame to be printed, corresponding to the frame time provided in the print information. Accordingly, in an example, the image processing module 118 ascertains a quality factor of the extracted frame and selects the frame if the quality factor of the extracted frame is ascertained to be greater than a threshold quality factor. In a case, where the image processing module 118 ascertains the quality factor of the extracted frame to be less than the threshold quality factor, the image processing module 118 may select another frame from the frames in the vicinity of the frame time. In another example, the image processing module 118 can apply quality enhancement techniques on the earlier extracted frame so that the quality factor of the extracted frame is equal to or greater than the threshold quality factor.

In another case, where the video is recorded at a high rate, the extraction module 116 can extract a plurality of frames corresponding to the frame time. Subsequently, the image processing module 118 can compute a quality factor for each of the plurality of frames, compare the same with the threshold quality factor, and select the frame with the highest quality factor.

Once the frame to be printed is obtained by the system 102, the system 102 transmits the frame to the cloud print server 110. Subsequently, the cloud print server 110 transmits the frame to the printer 112 for printing. In one example, the system 102 first renders the frame into an image and transmits the same to the cloud print server 110. Thus, the system 102, according to the present subject matter, provides an efficient system for printing a frame of a video. The system 102 and the method described herein eliminate the need for installation of the printer drivers on user devices. Moreover, the user can print the frame from any user device without having to worry about configuration of printer on the user device.

Figure 2:
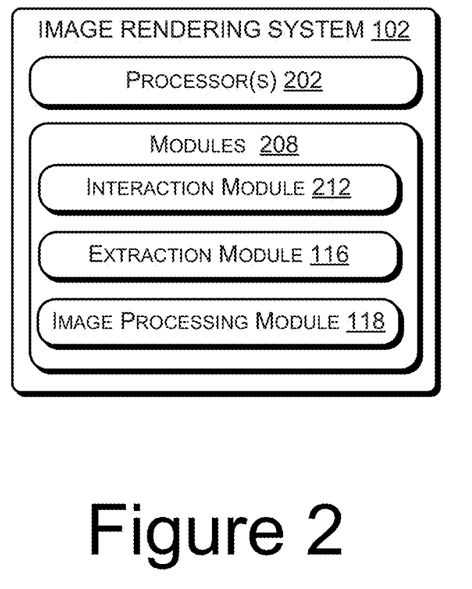
FIG. 2 illustrates the components of an image rendering system for printing a frame of a video over a network, according to an example of the present subject matter.

FIG. 2 illustrates the details of the components of the system 102, in accordance with the principles of the present subject matter. In one implementation, the system 102 may can include processor(s) 202 and modules 208. The processor(s) 202 may be implemented as microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory.

In one implementation, the modules 208 may be coupled to the processor(s) 104. The modules 208, amongst other things, include routines, programs, objects, components, data structures, which perform particular tasks or implement particular abstract data types. The modules 208 may also be implemented as, signal processor(s), state machine(s), logic circuitries, and/or any other device or component that manipulate signals based on computer-readable instructions. In said implementation, the module(s) 208 further include an interaction module 212, the extraction module 116 and the image processing module 118.

In one example, the interaction module 212 is configured to obtain print information from a user device for printing a frame of a video. The print information includes information indicative of the frame to be printed. In one case, the print information includes a frame time and a video stored locally on a user device of the user. In another example, where the video is hosted on a video streaming portal, the print information includes the frame time and a uniform resource locator of the video. Further, the extraction module 116 acquire a segment of the video, based on the print information. In one example, the segment includes a set of frames from among an entire set of frames of the video. Thereafter, the extraction module 116 extracts at least one frame from the segment, based on the print information.

Further, the image processing module 118 determines a quality factor of the extracted frame and selects the extracted frame based on the quality factor.

Figure 2A:
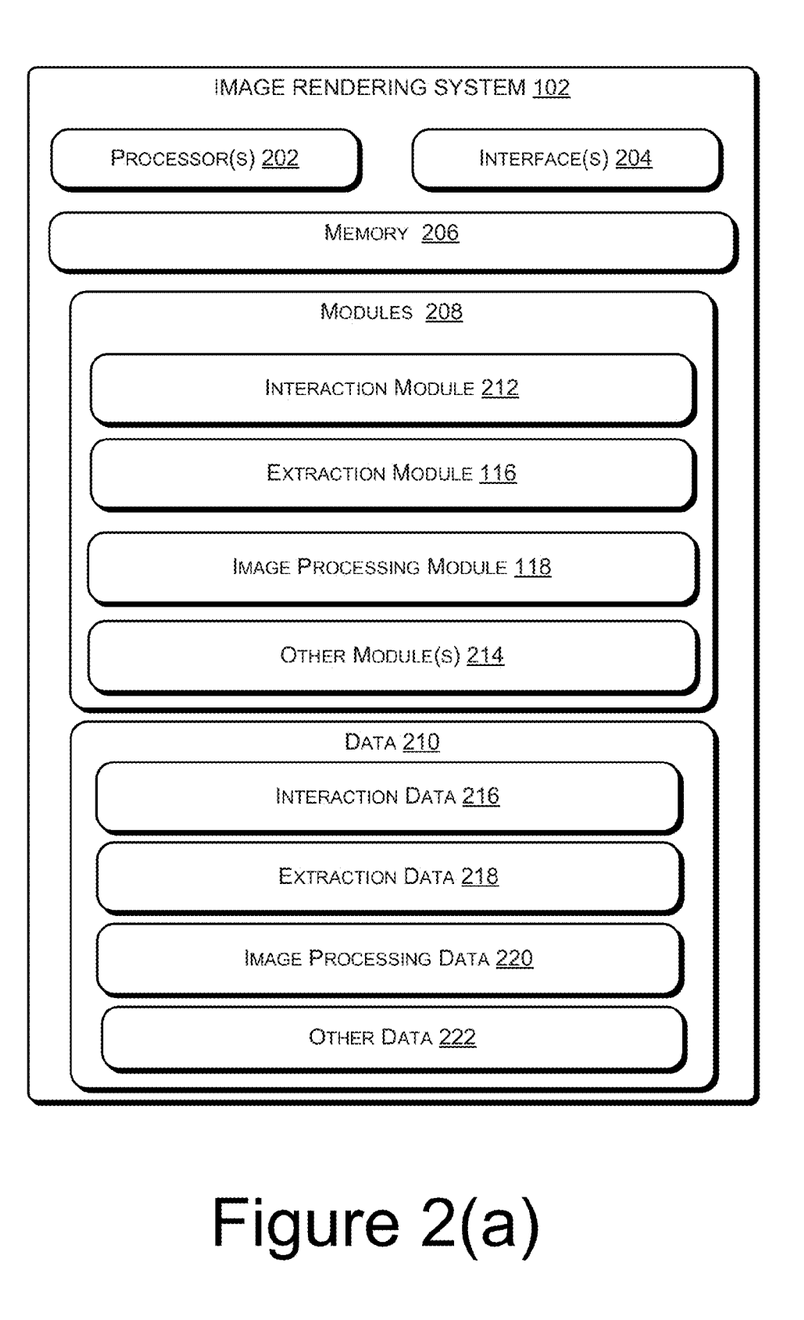
FIG. 2(a) illustrates the details of the components of an image rendering system for printing a frame of a video over a network, according to an example of the present subject matter.

FIG. 2(a) illustrates the details of the components of the system 102, in accordance with the principles of the present subject matter. The system 102 may further include interfaces and memory. The functions of the various elements shown in FIG. 2(a), including any functional blocks labeled as processor(s), may be provided through the use of dedicated hardware as well as hardware capable of executing software in association with appropriate software.

The system 102 also includes interface(s) 204. The interface(s) 204 may include a variety of software and hardware interfaces, for example, interface for peripheral device(s), such as a keyboard, a mouse, an external memory, a printer, etc. Further, the interface(s) 204 may enable the system 102 to communicate over the network 106, and may include one or more ports for connecting the system 102 with other computing devices, such as web servers and external databases. The interface(s) 204 may facilitate multiple communications within a wide variety of protocols and networks such as a network, including wired networks, e.g., LAN, cable, etc., and wireless networks, e.g., WLAN, cellular, satellite, etc.

Further, the system 102 also includes memory 206, coupled to the processor 202, The memory 206 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the system 102 may include the modules in any non-transitory computer readable medium such as the memory 206. Further, the system 102 may include data 210.

In addition to the modules as illustrated in FIG. 2, the system 102 may include other module(s) 214. The other module(s) 214 may include programs or coded instructions that supplement applications and functions on the system 102, for example, programs in the operating system. The data 210, amongst other things, serves as a repository for storing data processed, received, and generated by one or more of the modules 208. The data 210 includes an interaction data 216, an extraction data 218, an image processing data 220 and other data 222. The other data 222 may include data generated as a result of the execution of one or more modules in the other module(s) 214.

As explained above, the system 102 can receive print information from the user device 104-1 for printing a frame of a video. In one example, the print information may include a URL of a video streaming portal over which the user is watching the video and a frame time corresponding to the frame which is to be printed. In another example, the print information may include the video file and the frame time.

In operation, the interaction module 212 receives and stores the print information in the interaction data 216. In order to process the print information, the extraction module 116 obtains and analyses the print information. In one implementation, the extraction module 116 can ascertain whether the print information includes the video or not. If the extraction module 116 determines that the print information includes the video, the extraction module 116 obtains a segment of the video based on the frame time specified in the print information. In one example, the segment includes a set of frames from among an entire set of frames of the video. For instance, if the frame time is at 30 seconds, the segment may include a set of frames spanning over a time slot of 5 seconds, say 27 to 32 seconds. On the other hand, if the extraction module 116 determines that the print information does not include the video, the extraction module 116 obtains the segment, corresponding to the frame time, of the video based on the URL included in the print information. For instance, the extraction module 116 may download the segment of the video based on the frame time provided in the print information. For example, if the frame time is 32 seconds, the extraction module 116 may ascertain the segment to be in the range of 30 to 33 seconds and obtain the segment corresponding to the time slot. In another example, the extraction module 116 may obtain the entire video based on the URL provided in the print information and subsequently extract the segment from the video based on the frame time.

Further, the extraction module 116 processes the extracted segment to extract the frame to be printed, corresponding to the frame time as provided in the print information. In an example, while processing the segment, the extraction module 116 can decode the segment to obtain a plurality of frames. For instance, the extraction module 116 may utilize a video frame extraction tool for extracting the frame from the segment of the video.

In an example, consider that the frame time is 10.5 seconds. In such a case, the extraction module 116 can select a segment of the video spanning two seconds in the vicinity of the frame time, i.e., from 9.5 seconds to 11.5 seconds. Subsequently, the extraction module 116 can begin extracting the frames from the segment and obtain frames spanning for a duration of 2 seconds. The extraction module 116 stores the extracted frames in the extraction data 218.

Thereafter, the image processing module 118 selects the frame based on the frame time specified in the print information. In the above example, from the frames spanning from 9.5 seconds to 11.5 seconds, the image processing module 118 obtains the frame corresponding to the frame time of 10.5 seconds.

In one case in which the video is recorded at a low rate, say about 24 frames per second (fps), when the image processing module 118 selects the frame corresponding to the frame time, one frame may be selected. The image processing module 118 at first computes a quality factor for the extracted frame. In an implementation, the quality factor may be a sum total of several characteristics of a frame, such as number of pixels, image resolution, contrast, brightness. Subsequently, the image processing module 118 compares the quality factor of the extracted frame with a threshold quality factor in the image processing data 220, and determines whether the extracted frame can be selected for printing or not. If the quality factor is greater than the threshold quality factor, the image processing module 118 may select the extracted frame for printing. If determined otherwise, the image processing module 118 may utilize quality enhancement techniques and subsequently select a frame from the plurality of frames in the vicinity of the frame time.

In another case in which the video is recorded at a high rate, say about 60 fps or 80 fps, then the image processing module 118 can identify a plurality of frames corresponding to the frame time. For instance, for a video operating at 60 fps, the image processing module 118 can identify 10 frames for the frame time of $11^{th}$ second. In such a scenario, the image processing module 118 can determine the quality factor associated with each frame from the plurality of frames, and the frame with the highest quality factor can be selected for printing.

Once the image processing module 118 has obtained the selected frame from the video, the image processing module 118 stores the frame in the image processing data 220. In one example, the image processing module 118 may render the frame as an image and store the image in the image processing data 220.

Subsequently, the interaction module 212 can transmit the frame stored in the image processing data 220 to the cloud print server 110. In the above example, in which the image processing module 118 renders the frame to obtain the image, the interaction module 212 can transmit the rendered image to the cloud print server 110. The cloud print server then prints the same using a printer 112 connected to the cloud print server 110. Although functionalities of printing a frame of a video has been described with reference to the image rendering system 102, it will be appreciated that some or all of the functionalities may be implemented in the cloud print server 110.

Figure 3:
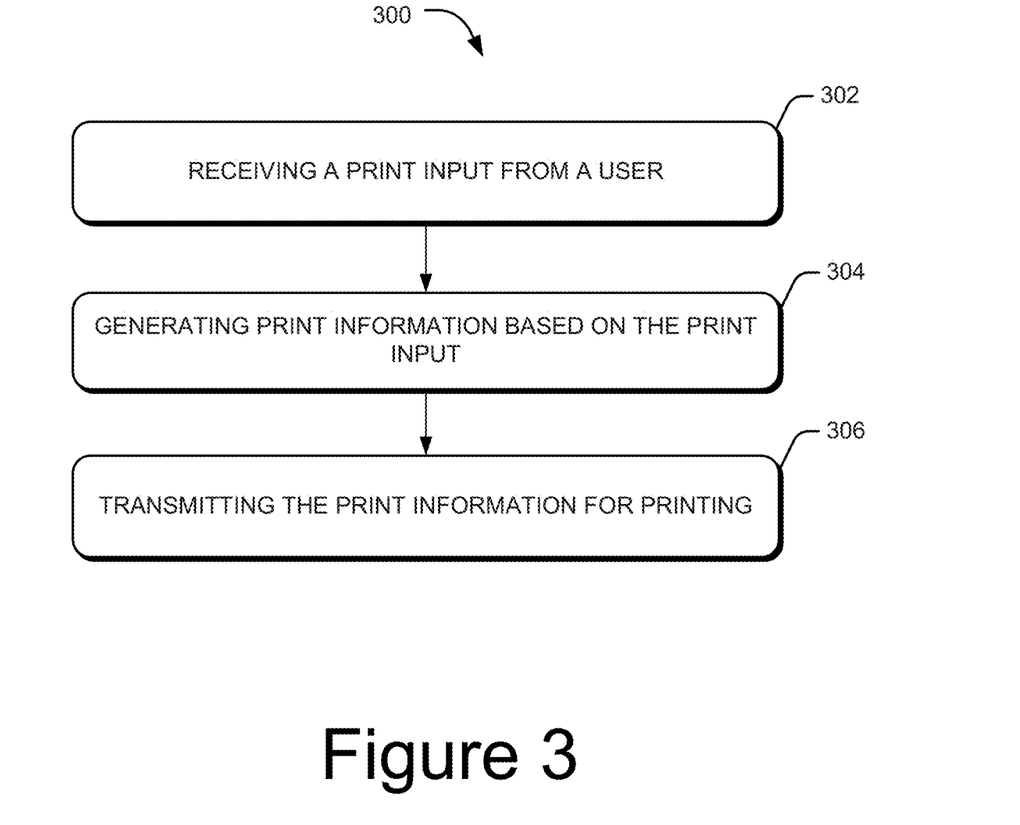
FIG. 3 illustrates a method for creating print information for printing a frame of a video over a network, according to an example of the present subject matter.
Figure 4:
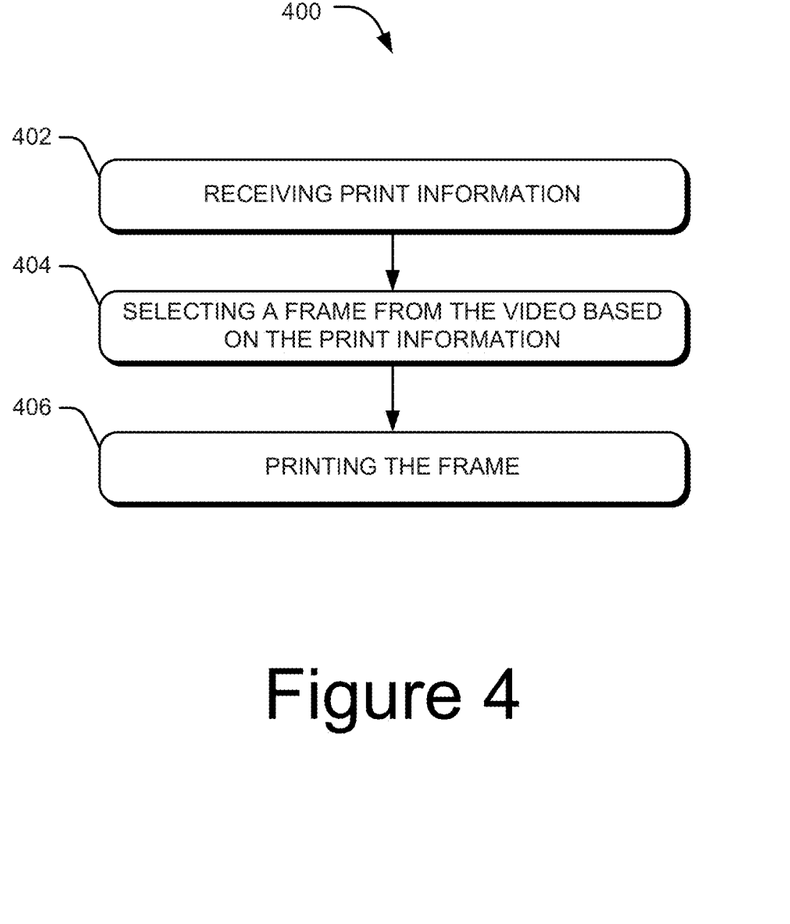
FIG. 4 illustrates a method for printing a frame of a video over a network, according to an example of the present subject matter.
Figure 5:
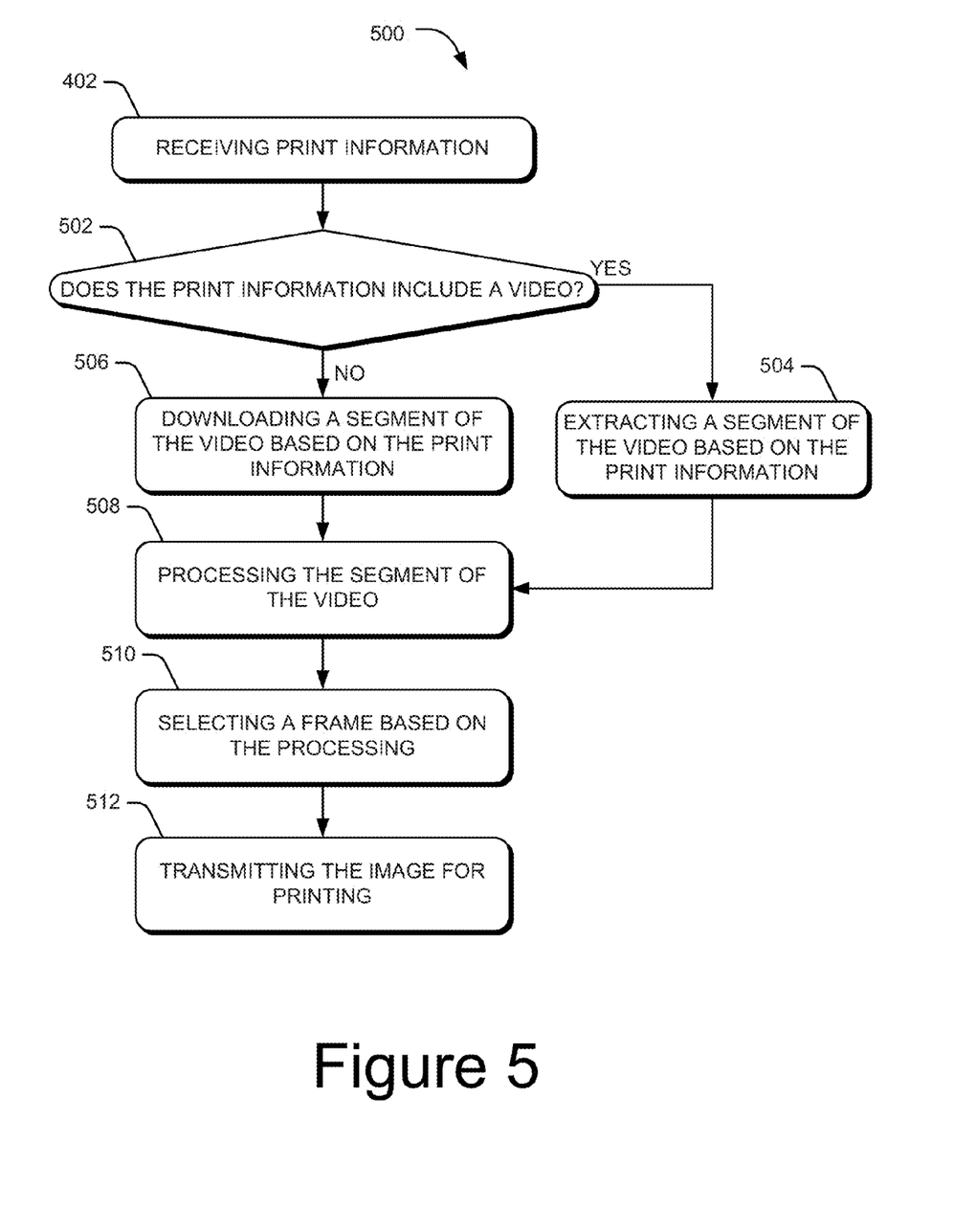
FIG. 5 illustrates details of the method for printing a frame of a video over a network, according to an example of the present subject matter.

FIG. 3 illustrates a method 300 for creating print information for printing a frame of a video over a network, according to an example of the present subject matter. FIG. 4 illustrates a method 400 for printing a frame of a video using cloud printing, according to examples of the present subject matter. Further, FIG. 5 illustrates details of the method 400 for printing the frame of the video using cloud printing, according to examples of the present subject matter.

The order in which the methods 300, 400 and 500 are described is not intended to be construed as a limitation, and any number of the described method blocks can be combined in any order to implement methods 300, 400 and 500, or an alternative method. Additionally, individual blocks may be deleted from the methods 300, 400 and 500 without departing from the spirit and scope of the subject matter described herein. Furthermore, the methods 300, 400 and 500 may be implemented in any suitable hardware, machine readable instructions, firmware, or combination thereof.

A person skilled in the art will readily recognize that steps of the methods 300, 400 and 500 can be performed by programmed computers. Herein, some examples are also intended to cover program storage devices and non-transitory computer readable medium, for example, digital data storage media, which are machine or computer readable and encode machine-executable or computer-executable instructions, where said instructions perform some or all of the steps of the described methods 300, 400 and 500. The program storage devices may be, for example, digital memories, magnetic storage media such as a magnetic disks and magnetic tapes, hard drives, or optically readable digital data storage media.

With reference to method 300 as illustrated in FIG. 3, at block 302, a print input for printing a frame of a video being viewed is received from a user. In one implementation, the user may provide the print input through a print button embedded in a video player. In another implementation, the print input may be provided through a print button in a widget application. The print button may further provide the user with several options, such as quality of the paper, single side print option, double side print option, number of copies in a menu. Moreover, the menu may also provide the user with an option to select a printer from amongst a pool of available printers connected through a cloud print server for printing the frame.

At block 304, print information based on the print input is generated. In one implementation, the print information may include a URL of the video and a frame time corresponding to the frame to be printed. As described previously, the URL corresponding to a quality selected by the user will be included in the print information. For example, in a case where the user is watching a low quality version of the video on a video streaming portal and wants to print a high quality image of the frame, if available, the user may print the same as high quality image and select a URL version corresponding to the high quality option provided in the menu. In another implementation, where the video is stored on a user device corresponding to the user, the print information may include the video and the frame time. In one example, the print information module 114 generates the print information.

At block 306, the print information is transmitted for printing. In one implementation, the user device transmits the print information to the image rendering system 102 for printing the frame of the video using cloud printing.

FIG. 4, as aforementioned, illustrates an overall method for printing frames of a video using cloud computing. With reference to FIG. 4, at block 402, the print information is received. As described above, in an example, the print information can be generated by the user device 104 and transmitted to the image rendering system 102.

In one implementation, the print information includes a video, stored locally on a user device of a user, and a frame time corresponding to a frame which the user seeks to print. In another implementation, the print information may include a URL of a video streaming portal and the frame time.

At block 404, a frame is selected from the video, based on the print information. In an example, a segment, corresponding to the frame time, of the video is acquired. Thereafter, a frame is selected from the segment based on the frame time included in the print information. In another example, where the video is recorded at high rate, a plurality of frames are extracted based on the frame time specified in the print information and a frame is selected from amongst the plurality of frames.

At block 406, the frame is printed. In an example, the frame is printed using cloud printing technique. For instance, the image rendering system 102 can send the selected frame to the cloud print server 110 for printing. Subsequently, the cloud print server 110 prints the frame using the printer 114.

FIG. 500 illustrates details of method 400. Accordingly, with reference to method 500 as illustrated in FIG. 5, as depicted in block 402, print information is received. In one implementation, the print information includes a URL of a video streaming portal and a frame time corresponding to a frame of a video that a user intends to print. In another implementation, where the video is stored locally on a user device of the user, the print information may include the video and the frame time. In one example, the system 102 receives the print information.

At block 502, it is ascertained whether the print information includes a video. In one implementation, the extraction module 116 ascertains whether the print information includes the video. If it is determined that the print information includes the video, which is the YES path, the method proceeds to block 504. At block 504, the extraction module 116 obtains a segment of the video based on the frame time specified in the print information. If it is determined that the print information does not include the video, which is the NO path, the method proceeds towards block 506.

At block 506, the extraction module 116 obtains the segment of the video based on the URL provided in the print information. For example, if the user is watching a video on YouTube™, then the print information will include a URL of the video hosted on YouTube™. The extraction module 116 downloads the video from YouTube™ video server. In said example, if the frame time is 25 seconds, the extraction module may ascertain the segment to be in the range of 23 to 27 seconds and download the same. In another example, the extraction module 116 may obtain the complete video based on the URL provided in the print information.

At block 508, the segment of the video is processed. In one implementation, the extraction module 116 extracts the frame based on the frame time included in the print information. In another example, where the video is recorded at a high rate, the extraction module 116 extracts a plurality of frames based on the frame time provided in the print information using a video frame extraction tool.

At block 510, a frame is selected based on the processing. In one implementation, the image processing module 118 selects the frame for printing, based on the frame time specified in the print information. In another example, in case in which the video is recorded at high speed, say at 60 frames per second (fps) or 75 fps, the image processing module 118 selects the frame from amongst the plurality of frames corresponding to the frame time.

In said example, while selecting the frame, a quality of the frames is determined. For instance, based on various characteristics of the frame, say number of pixels, image resolution, contrast, and brightness, a quality factor for the frame can be determined. Further, based on the quality factor of the frame and a threshold quality factor, the frame can be selected or rejected for printing.

In said example, if the quality of the frame does not meet the threshold quality factor, then quality enhancement techniques can be applied to the frame. For instance, frames adjacent to the previously processed frame, i.e., frames lying adjacent to the frame time can be obtained and processed, to determine if such adjacent frames meet the threshold quality factor. In another case, quality enhancement techniques may include noise cancellation techniques and blur removal techniques. Such techniques may then be applied to the previously selected frame to enhance the quality. As will be understood, after the application of the quality enhancement techniques, the quality factor of the processed frame is again checked against the threshold quality factor. In said example, in one scenario, if the threshold quality factor is not met by any of the frames after application of quality enhancement techniques, then the frame having the highest quality factor can be selected for printing.

In the other scenario, in which a plurality of frames is initially identified, the quality factor for each frame can be determined, and the frame with the highest quality factor can be selected for printing. Further, in one case, the image processing module 118 may render the frame into an image.

At block 512, the frame is transmitted for printing. In one example, the interaction module 212 transmits the frame over the network 106 to the cloud print server 110. In another case, the interaction module 212 transmits the image, rendered from the frame, to the cloud print server 110. The cloud print server 110 prints the frame using the printer 112. The printer 112 may be any of the various commercially available printers for supporting printing over a cloud network, such as the cloud network 108.

Thus, the method 500 facilitates printing of a frame of a video using cloud printing without the user having to take a snapshot of the frame thereby reducing the tedious effort and time needed for the same.

Figure 6:
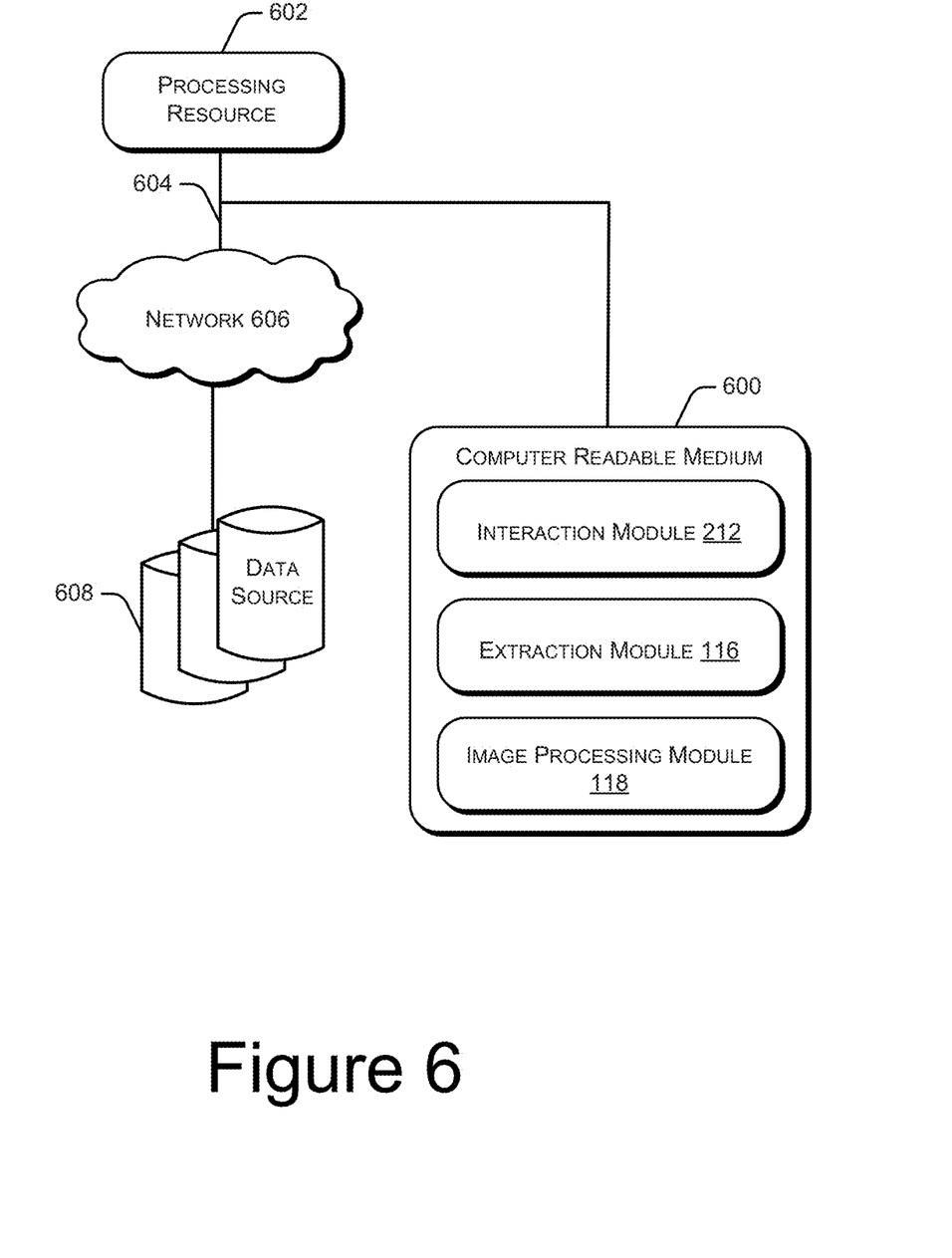
FIG. 6 illustrates a computer readable medium storing instructions for printing a frame of a video over a network, according to an example of the present subject matter.

FIG. 6 illustrates a computer readable medium 600 storing instructions for printing a frame of a video, according to an example of the present subject matter. In one example, the computer readable medium 600 is communicatively coupled to a processing resource 602 over a communication link 604.

In one example, the processing resource 602 can be a computing device, such as a server, a laptop, a desktop, a mobile device, and the like. The computer readable medium 600 can be, for example, an internal memory device or an external memory device or any commercially available non transitory computer readable medium. In one implementation, the communication link 604 may be a direct communication link, such as any memory read/write interface. In another implementation, the communication link 604 may be an indirect communication link, such as a network interface. In such a case, the processing resource 602 can access the computer readable medium 600 through a network 606. The network 606, like the network 106, may be a single network or a combination of multiple networks and may use a variety of different communication protocols.

The processing resource 602 and the computer readable medium 600 may also be communicatively coupled to data sources 608 over the network. The data sources 608 can include, for example, databases and computing devices. The data sources 608 may be used by the requesters and the agents to communicate with the processing unit 602.

In one implementation, the computer readable medium 600 includes a set of computer readable instructions, such as authentication code generation module 120 and the authentication module 122. The set of computer readable instructions can be accessed by the processing resource 602 through the communication link 604 and subsequently executed to perform acts for printing of electronic messages.

On execution by the processing resource 602, the interaction module 212 receives a print information for printing a frame of a video. In a case where the video is stored on a user device, the print information includes a frame time indicative of the frame to be printed and a video. In another example, where the video is being viewed on a video streaming portal, the print information may include the frame time and a uniform resource locator (URL) of the video. For the purpose of explanation, on receiving the print information, the extraction module 116 may obtain a segment of the video based on the print information. In one implementation, the segment may include a set of frames from among an entire set of frames of the video. In one example, where the print information includes the URL, the extraction module 116 may retrieve the video from a server of the video streaming portal. In another example, the extraction module 116 obtains the video included in the print information. Further, the extraction module may extract at least one frame corresponding to the frame time included in the print information. In a case where the video is recorded at a high rate, the extraction module 116 may extract a plurality of frames.

Further, the image processing module 118 selects the frame to be printed from the segment of the video. In one example, the image processing module 118 may determine a quality factor for the extracted frame and compare the quality factor with a threshold value. If it is determined that the quality factor is less than the threshold value, the image processing module 118 may apply a quality enhancement technique on the extracted frame. In another case, where a plurality of frames are extracted, the image processing module 118 may determine a quality factor for each of the extracted frame and the frame with the highest quality factor may be selected for printing.

Thereafter, the interaction module 212 may transmit the selected frame for printing. In one example, the interaction module 212 may render the frame into an image and then subsequently transmit the image for printing. In one example, the processing resource 602 may transmit the frame to a cloud print server of a cloud network (not shown in figure), such as the cloud print server 110 through the network 606. The cloud print server subsequently prints the frame through a printer connected to the cloud print server.

Although, the functionalities of segmenting and extracting the frame for printing has been described with reference to the system 102, it will be appreciated that similar functionalities may be implemented in the cloud print server 110.

Although implementations for printing a frame of a video using cloud printing have been described in language specific to structural features and/or methods, it is to be understood that the appended claims are not necessarily limited to the specific features or methods described. Rather, the specific features and methods are disclosed as examples of systems and methods for printing a frame of a video using cloud printing.

I claim:

1. A method, comprising by a server computer:
   from a user device, receiving print information comprising a frame time corresponding to a frame of the video designated to be printed;
   selecting a frame from a segment of the video comprising the frame designated to be printed based on the frame time in the print information and a quality assessment of the selected frame, wherein the selecting comprises selecting a frame from the segment that is different from the frame designated to be printed in response to a determination that frame designated to be printed has a quality below a threshold level; and
   printing the selected frame from a printer.

2. The method as claimed in claim 1, wherein the print information further comprises one of a uniform resource locator (URL) of the video and the video.

3. The method as claimed in claim 1, wherein the selecting comprises:
obtaining the segment of the video, based on the print information, the segment including a set of frames from among an entire set of frames of the video;
extracting the selected frame from the segment; based on the print information;
determining a quality factor for the extracted frame; and
applying a quality enhancement technique on the extracted frame; based on the determined quality factor.

4. The method as claimed in claim 1, wherein the selecting comprises:
obtaining the segment of the video; based on the print information, the segment including a set of frames from among an entire set of frames of the video;
identifying a plurality of frames of the video from the obtained segment; based on the print information;
determining a quality factor for each of the plurality of frames; and
selecting the frame to be printed from among the plurality of frames; based on the quality factors determined for the plurality of frames.

5. The method as claimed in claim 1, wherein the printing comprises rendering the frame to obtain a rendered frame and transmitting the rendered frame to a cloud print server connected to the printer for printing.

6. An image rendering system, comprising:
a processor, and
an interaction module coupled to the processor to obtain print information from a user device, the print information being indicative of a frame of a video designated to be printed;
an extraction module coupled to the processor to,
acquire a segment of frames of the video comprising the frame designated to be printed based on the print information; and
an image processing module coupled to the processor to,
determine a quality factor for each of one or more of the frames of the segment of the video; and
select a frame from the segment of the video based on the one or more determined quality factors, wherein a frame from the segment that is different from the frame designated to be printed is selected in response to a determination that frame designated to be printed has a quality factor below a threshold level.

7. The image rendering system as claimed in claim 6 wherein the image processing module is operable to,
compare the quality factor of the extracted frame with a threshold quality factor; and
apply a quality enhancement technique on the extracted frame based on the comparison.

8. The image rendering system as claimed in claim 6 wherein:
the extraction module is operable to extract a plurality of frames of the video from the segment; and
the image processing module is operable to,
determine a quality factor for each of the plurality of frames; and
select the frame to be printed from among the plurality of frames, based on the quality factor for the each of the plurality of frames.

9. The image rendering system as claimed in claim 6 wherein the interaction module is operable to transmit the selected frame to a cloud print server over a cloud network for printing.

10. The image rendering system as claimed in claim 6, wherein the print information comprises a frame time corresponding to the frame to be printed, and one of a uniform resource locator (URL) of the video and the video.

11. A non-transitory computer-readable medium having a set of computer readable instructions that, when executed, cause a processor to perform operations comprising:
receiving print information from a user device, the print information being indicative of a frame to be printed;
obtaining a segment of a video based on the print information, wherein the segment comprises the frame to be printed;
selecting a frame from the segment based on the print information and a quality factor of the selected frame, wherein the selecting comprises selecting a frame from the segment that is different from the frame to be printed in response to a determination that frame to be printed has a quality below a threshold level; and
transmitting the selected frame for printing.

12. The non-transitory computer-readable medium as claimed in claim 11, wherein the instructions, when executed, further cause the processor to render the frame and transmit the rendered frame to a cloud print server for printing.

13. The non-transitory computer-readable medium as claimed in claim 11, wherein the instructions, when executed, further cause the processor to:
determine a quality factor for the selected frame; and
apply a quality enhancement technique on the selected frame based on the determined quality factor.

14. The non-transitory computer-readable medium as claimed in claim 11, wherein the instructions, when executed, further cause the processor to:
identify a plurality of frames of the video from the segment, based on the print information;
determine a quality factor for each of the plurality of frames; and
select the frame to be printed from among the plurality of frames, based on the quality factor determined for the each of the plurality of frames.

15. The non-transitory computer-readable medium as claimed in claim 11, wherein the print information comprises a frame time corresponding to the frame to be printed, and one of a uniform resource locator (URL) of the video and the video.

* * * * *

UNITED STATES PATENT AND TRADEMARK OFFICE
CERTIFICATE OF CORRECTION

PATENT NO. : 9,055,169 B2  
APPLICATION NO. : 13/853226  
DATED : June 9, 2015  
INVENTOR(S) : Srivatsan Mohan Page 1 of 1

It is certified that error appears in the above-identified patent and that said Letters Patent is hereby corrected as shown below:

Claims

In column 13, line 3, in Claim 3, delete "video," and insert -- video --, therefor.

In column 13, line 6, in Claim 3, delete "segment;" and insert -- segment --, therefor.

In column 13, line 10, in Claim 3, delete "frame;" and insert -- frame --, therefor.

In column 13, line 13, in Claim 4, delete "video;" and insert -- video --, therefor.

In column 13, line 17, in Claim 4, delete "segment;" and insert -- segment --, therefor.

In column 13, line 21, in Claim 4, delete "frames;" and insert -- frames --, therefor.

In column 13, line 28 approx., in Claim 6, delete "processor," and insert -- processor; --, therefor.

Signed and Sealed this  
Twenty-ninth Day of March, 2016

Michelle K. Lee  
*Director of the United States Patent and Trademark Office*